United States Patent
Hayakawa et al.

(10) Patent No.: US 8,842,338 B2
(45) Date of Patent: Sep. 23, 2014

(54) PRINTER DRIVER

(75) Inventors: Yukihiro Hayakawa, Kanagawa (JP); Naoyuki Urata, Kanagawa (JP); Kanna Iinuma, Kanagawa (JP); Kenichi Fujioka, Kanagawa (JP); Hiroyuki Abiru, Kanagawa (JP); Teruyoshi Yamamoto, Kanagawa (JP); Ken Mitsui, Kanagawa (JP); Yuu Yamashita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 73 days.

(21) Appl. No.: 13/534,197

(22) Filed: Jun. 27, 2012

(65) Prior Publication Data

US 2013/0003098 A1 Jan. 3, 2013

(30) Foreign Application Priority Data

Jun. 29, 2011 (JP) ................. 2011-144230

(51) Int. Cl.
- *G06F 15/00* (2006.01)
- *G06F 3/12* (2006.01)
- *G06K 15/00* (2006.01)
- *G06K 15/02* (2006.01)

(52) U.S. Cl.
CPC ............ *G06F 3/1205* (2013.01); *G06F 3/1243* (2013.01); *G06F 2206/1514* (2013.01); *G06F 3/1257* (2013.01); *G06F 3/1254* (2013.01)
USPC ............ 358/1.9; 358/1.15; 358/1.16; 358/1.2

(58) Field of Classification Search
None
See application file for complete search history.

(56) References Cited

U.S. PATENT DOCUMENTS

| 2007/0121144 A1* | 5/2007 | Kato | 358/1.14 |
| 2008/0049249 A1* | 2/2008 | Tomita | 358/1.15 |
| 2011/0273741 A1* | 11/2011 | Mukasa | 358/1.15 |

FOREIGN PATENT DOCUMENTS

| JP | 2004110638 A | 4/2004 |
| JP | 4539975 B2 | 9/2010 |

OTHER PUBLICATIONS

English language abstract for Japanese Patent Publication No. 2006-178747 published on Jul. 6, 2006.

* cited by examiner

*Primary Examiner* — Thomas Lett
(74) *Attorney, Agent, or Firm* — Harness, Dickey & Pierce, P.L.C.

(57) ABSTRACT

In a printer driver, combinations of standard print conditions and standard render data are saved as standard patterns, and combinations of standard print conditions and standard render data used for exceptional settings are saved as print application patterns. The print application patterns and the standard patterns are associated with each other. When printing document data, print condition data and render data are spooled by each page, the standard print conditions and the standard render data are compared, and a most similar standard pattern is detected. The print application pattern corresponding to the detected standard pattern is referred to, and print conditions are generated by combining standard print conditions and print conditions of the document data for each page. From the render data of the document data or from the standard render data, print data that can be processed by the printer is generated.

5 Claims, 8 Drawing Sheets

FIG.3

| SETTING ITEM | IDENTIFIER cpA | IDENTIFIER cpB | ... | IDENTIFIER cpO | ... | IDENTIFIER cpZ |
|---|---|---|---|---|---|---|
| DOCUMENT SIZE | A4 | A3 | ... | COMPLY WITH DOCUMENT SETTING | ... | B4 |
| PRINT SHEET SIZE | COMPLY WITH DOCUMENT SETTING | A3 | ... | COMPLY WITH DOCUMENT SETTING | ... | B4 |
| SHEET TYPE | COMPLY WITH DOCUMENT SETTING | COMPLY WITH DOCUMENT SETTING | ... | COMPLY WITH DOCUMENT SETTING | ... | Plain |
| SHEET DIRECTION | COMPLY WITH DOCUMENT SETTING | COMPLY WITH DOCUMENT SETTING | ... | COMPLY WITH DOCUMENT SETTING | ... | SEF |
| PRINT DIRECTION | COMPLY WITH DOCUMENT SETTING | COMPLY WITH DOCUMENT SETTING | ... | COMPLY WITH DOCUMENT SETTING | ... | HORIZONTAL |
| ... | ... | ... | ... | ... | ... | ... |
| SINGLE-SIDED/ DOUBLE-SIDED | SINGLE-SIDED | DOUBLE-SIDED | ... | COMPLY WITH DOCUMENT SETTING | ... | DOUBLE-SIDED |

STANDARD PRINT CONDITIONS — 107

FIG.4
STANDARD RENDER DATA 108
| IDENTIFIER | STANDARD RENDER DATA (ASSEMBLY OF DDI CALLS) | RENDER IMAGE |
|---|---|---|
| IPA | DDI call A (a1, b1, c1, d1)<br>DDI call A (a2, b2, c2, d2)<br>DDI call B (a3, b3, c3, d3)<br>DDI call D (a4, b4, c4, d4)<br>DDI call D (a5, b5, c5, d5)<br>DDI call F (a6, b6, c6, d6) | 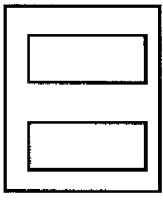 |
| IPB | DDI call B (a7, b7, c7, d7)<br>DDI call G (a8, b8, c8, d8)<br>DDI call H (a9, b9, c9, d9) | 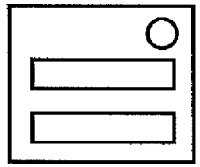 |
| ... | ... | |
| IPO | (BLANK PAGE) | 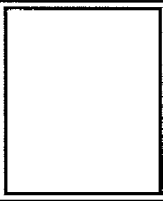 |
| ... | ... | |

FIG.5

PRINT PATTERN LIST 109

| ID | STANDARD PATTERN 110 | PRINT APPLICATION PATTERN 111 |
|---|---|---|
| P1 | cpO * (IPA + IPB + IPC) | cpO * (IPA + IPB + IPC + IPO) |
| P2 | cpA * (IPA + IPB + IPB + IPC) | cpA * (IPA + IPB + IPO + IPB + IPD) |
| P3 | cpO * (IPA + IPO + IPB + IPC) | cpO * (IPA + IPR + IPB + IPC) |
| P4 | cpO * (IPA + IPB) before cpO * (IPC + IPD) | cpO * (IPO + IPA + IPB) + cpO * (IPC + IPD) |
| P5 | cpB * (IPA + IPB + IPC) | cpB * (IPA + IPB) |
| ... | ... | ... |
| Pn | | |

FIG.6

| PRINT CONDITION DATA | STANDARD PRINT CONDITION cpA | STANDARD PRINT CONDITION cdB | ... | STANDARD PRINT CONDITION cdO | ... | STANDARD PRINT CONDITION cdZ |
|---|---|---|---|---|---|---|
| cd1 | 100 | 0 | ... | 100 | ... | 0 |
| cd2 | 100 | 0 | ... | 100 | ... | 0 |
| ... | ... | ... | ... | ... | ... | ... |
| cdm | 100 | 0 | ... | 100 | ... | 0 |

| PAGE NUMBER | RENDER DATA | STANDARD RENDER DATA IPA | STANDARD RENDER DATA IPB | STANDARD RENDER DATA IPC | STANDARD RENDER DATA IPD | ... | STANDARD RENDER DATA IPO |
|---|---|---|---|---|---|---|---|
| 1 | ID1 | 20 | 5 | 0 | 10 | ... | 0 |
| 2 | ID2 | 100 | 30 | 20 | 5 | ... | 0 |
| 3 | ID3 | 40 | 100 | 30 | 10 | ... | 0 |
| 4 | ID4 | 40 | 100 | 30 | 10 | ... | 0 |
| 5 | ID5 | 20 | 10 | 5 | 100 | ... | 0 |
| ... | ... | ... | ... | ... | ... | ... | ... |
| n | IDn | 0 | 0 | 0 | 0 | ... | 100 |

106

PRINTER DRIVER

BACKGROUND OF THE INVENTION

1. Field of the Invention

The present invention relates to a printer driver.

2. Description of the Related Art

In business operations for printing a large amount of forms with a high-end printer, individual variable print data such as customer information including a name, an address, a sum of money and a bar-code is embedded in the respective forms, and a plurality of predetermined forms are combined to create form data (print job) which is one purpose of the printing operation.

The formats of the forms are determined in advance, and various formats of forms are prepared in accordance with the purpose of the printing operation.

When printing such form data, a particular part of the form may be printed onto a "a particular type of paper sheet (e.g., a color sheet) that is specified for the form", a banner page or a slip sheet may be inserted between print jobs to separate the entire data of a particular form and the entire data of another particular form, a separation sheet may be inserted so that a bundle of forms is easily identified in terms of a particular range (for example, in units of areas or in units of individuals) in the form data, or a particular sheet may be replaced with another sheet that has already been printed.

When printing forms with the use of a printer driver described below, the above printing operations can be implemented by combining print settings of the entire document and exceptional settings.

Other than a function of making print settings for the entire document, a printer driver has a function of specifying exceptions (exceptional settings) of print settings, so that some pages such as pages having different sheet sizes can be printed according to different specifications from those of the print settings for the entire document.

In the exceptional settings, sheet attributes such as sheet size may be changed for each page, single-sided printing and double-sided printing may be combined, a plurality of logical pages may be arranged in one physical page, monochrome printing and color printing may be combined, banner pages, slip sheets, and separation sheets may be inserted, and a particular sheet may be replaced with another sheet that has already been printed.

To make exceptional specifications of print settings, the following types of print drivers are already known. Specifically, there is a print driver that can use different print settings for different sheet sizes of documents. Furthermore, there is a print driver that can specify exceptions for each page range. Furthermore, there is a print driver that can extract a common part of render instruction information of the respective pages, perform matching on the common part of render instruction information with a template of render instruction information stored in advance, and use the print setting information associated with the matched template information, so that printing conditions can be easily applied without making complex settings at the user interface for print settings.

Patent document 1 discloses the following printing technology. Specifically, the purpose of the printing technology is to provide a print setting control device/control method/program capable of easily applying print conditions, without making complex settings at the user interface for print settings. The printing technology involves associating "template information" indicating render instruction information common to the pages with "print setting information", extracting render instruction information common to the pages of a document, and executing printing with the use of "print setting information" corresponding to the template information when the extracted render instruction information and the "template information" match. That is to say, the printer driver specifies whether to apply the "print setting information" corresponding to the "template information", and when the printer driver receives a print instruction request from the OS (Operating System), it is determined whether there is a specification at this printer driver. When there is no specification, regular printing is executed with the use of "print setting information set at the print driver". When there is a specification, printing is executed with the use of a print setting corresponding to "render instruction information common to the pages", and when there is no print setting corresponding to "render instruction information common to the pages", regular printing is executed with the use of "print setting information set at the print driver".

However, in the conventional printer driver, when print settings can be made for the respective sheet sizes of documents, the following problem arises. That is to say, when exceptional settings are made, such as inserting banner pages, slip sheets, and separation sheets, or replacing a particular sheet with another sheet that has already been printed, it may not be possible to attain the expected print output results by associating the exceptional settings with the print settings for each sheet size. Therefore, a separate exception specification needs to be made for the corresponding pages.

Furthermore, when specifying exceptions for each page range, if the order of pages changes when the document data is edited after specifying a page range by the printer driver, it is necessary to specify the page range again by manual input in consideration of the document that has been changed by the printer driver.

A printer driver, which applies print conditions by using print setting information associated with template information, extracts the common part of the render instruction information of the respective pages, performs matching on the common part of render instruction information with a template of render instruction information stored in advance, and uses the print setting information associated with the matched template information.

Thus, in the page range matching the template information, the print setting associated with the template information can be applied. However, when exceptional settings are made, such as inserting banner pages, slip sheets, and separation sheets, or replacing a particular sheet with another sheet that has already been printed, or not printing a particular page, it may not be possible to attain the expected print output results, unless a separate exception specification is made for the corresponding pages.

Furthermore, the print setting associated with the template information is applied, and therefore the print settings set for the document data is overwritten by the print settings associated with the template information. Accordingly, detailed print settings cannot be made for each page.

Patent Document 1: Japanese Patent No. 4539975

SUMMARY OF THE INVENTION

The present invention provides a printer driver in which one or more of the above-described disadvantages are eliminated.

A preferred embodiment of the present invention provides a printer driver that can execute printing by combining exceptional settings that are different from the print settings for the entire document, and more particularly provides a printer driver with which exceptional settings, such as inserting banner pages, slip sheets, and separation sheets, or replacing a particular sheet with another sheet that has already been printed, or not printing a particular page, can be specified in detail for each page, and the page range to which the exceptional settings are to be applied can be easily specified.

According to an aspect of the present invention, there is provided a printer driver that operates on basic software when printing with a printer from application software of a computer, the printer driver including a first unit configured to specify a print condition; a second unit configured to hold, as a standard pattern, a combination of a standard print condition and standard render data expressing render contents of document data; a third unit configured to hold, as a print application pattern, a combination of a standard print condition and standard render data used when inserting a banner page, a slip sheet, and a separation sheet, or replacing a particular sheet with another sheet that has already been printed, or not printing a particular page; a fourth unit configured to arbitrarily associate the print application pattern with the standard pattern; a fifth unit configured to spool a document print condition and document render data included in the document data for each page when printing the document data; a sixth unit configured to compare the document print condition and the document render data with the standard print condition and the standard render data, and detect a most similar standard pattern for each particular page range; a seventh unit configured to refer to the print application pattern corresponding to the detected standard pattern, and generate a print condition for each page of the particular page range; and an eighth unit configured to generate print data that can be processed by the printer, based on the document render data or the standard render data.

BRIEF DESCRIPTION OF THE DRAWINGS

Other objects, features and advantages of the present invention will become more apparent from the following detailed description when read in conjunction with the accompanying drawings, in which:

FIG. 3 illustrates an example of standard print conditions managed by a print pattern management unit;

FIG. 4 illustrates an example of standard render data managed by a print pattern management unit;

FIG. 5 illustrates an example of a print pattern list managed by a print pattern management unit;

FIG. 6 illustrates a process of comparing print condition data of a spool document list with standard print conditions performed by a render data comparison unit;

FIG. 7 illustrates an example of a process of comparing render data of a spool document list with standard render data performed by a render data comparison unit.

DETAILED DESCRIPTION OF THE PREFERRED EMBODIMENTS

A description is given, with reference to the accompanying drawings, of embodiments of the present invention.

Configuration and Operations

Figure 1:
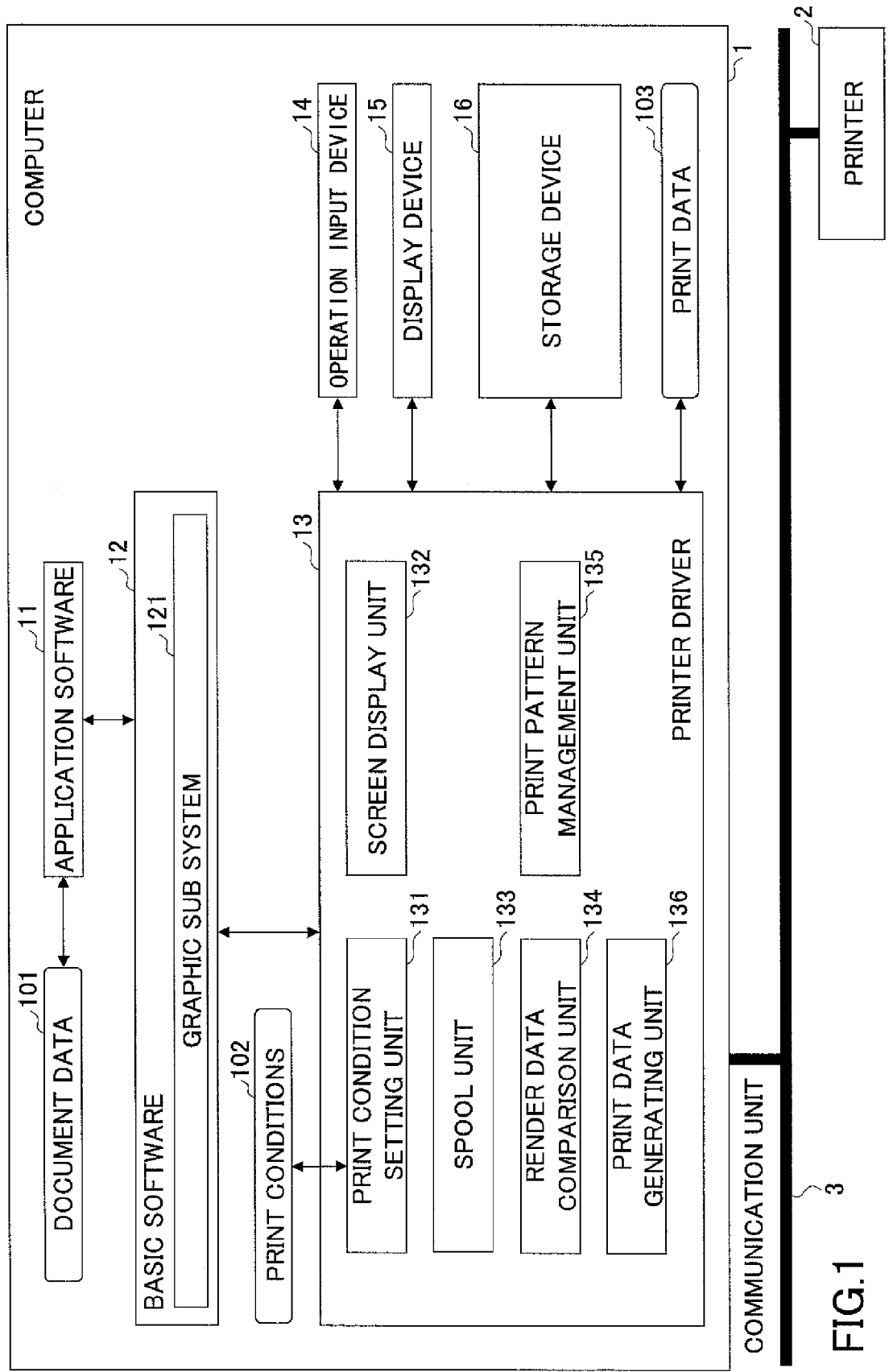
FIG. 1 illustrates a configuration of a system according to an embodiment of the present invention.

FIG. 1 illustrates a configuration of a system according to an embodiment of the present invention.

In FIG. 1, a computer 1 is connected to a printer 2 via a communication unit 3. The computer 1 includes application software 11, basic software 12, a printer driver 13, an operation input device 14, a display device 15, and a storage device 16. The printer driver 13 operates on the basic software 12. The basic software 12 includes a graphic sub system 121.

The printer driver 13 includes a print condition setting unit 131, a screen display unit 132, a spool unit 133, a render data comparison unit 134, a print pattern management unit 135, and a print data generating unit 136.

When printing document data 101 with the printer 2, the application software 11 reads the document data 101, and gives an instruction to start printing to the printer driver 13 via the graphic sub system 121 of the basic software 12.

When the print start instruction is given from the application software 11 to the graphic sub system 121, the graphic sub system 121 calls the printer driver 13, and the printer driver 13 starts a process to generate print data from the document data 101.

The application software 11 gives, to the graphic sub system 121, instructions relevant to the start/end of a document, the start/end of each page, print conditions such as the sheet size and single-sided printing/double-sided printing, and rendering contents of each page such as characters, figures, and images.

The printer driver 13 receives instruction contents of the application software 11 from the graphic sub system 121. More specifically, in Windows (registered trademark) of Microsoft, instruction contents from the application software 11 are passed to the printer driver 13 by a DDI (Device Driver Interface) call.

The printer driver 13 converts the respective rendering contents such as characters, figures, and images of the document data 101 transmitted from the application software 11, into print data 103 such as PDL (Page Description Language) that can be processed by the printer 2, according to print conditions 102 specified by the user.

The print data 103 is transmitted by the communication unit 3 to the printer 2, via the graphic sub system 121 of the basic software 12.

The printer 2 converts the received print data 103 into image data that can be processed by the print engine, prints the contents of the image data onto a sheet fed by a sheet feeding unit, and sends the sheet to the sheet eject unit.

The print condition setting unit 131 of the printer driver 13 displays a setting screen of the print conditions 102 on the display device 15 by the screen display unit 132, in response to a request from the application software 11 and the graphic sub system 121. Then, as a user operates the operation input device 14, it is possible to set the print conditions 102 of functions of the printer 2 and the printer driver 13, such as the sheet size, single-sided/double-sided printing, the selection of the sheet feeding/discharging location, and print resolution. The set print conditions 102 are reported to the application software 11 and the graphic sub system 121 from which the request is received.

When the application software 11 prints the document data 101, the print conditions 102 corresponding to the document data 101 are passed to the printer driver 13 via the graphic sub system 121, together with the render contents of the document data 101.

The spool unit 133 of the printer driver 13 receives the print instruction contents of the application software 11 from the graphic sub system 121, and saves, for each page, the print conditions and the page render contents among the print instruction contents.

The print instruction contents of the application software 11 include print control of the start/end of a document and the start/end of each page, print conditions such as the sheet size, single-sided printing/double-sided printing, the selection of the sheet feeding/discharging location, and print resolution when printing the document data 101 set by the user, and page rendering contents such as characters, figures, and images rendered on each page of the document data 101.

The spool unit 133 starts and ends a print job and determines boundaries between pages according to print control, saves print condition data 105 (see FIG. 2) indicating the sheet size, single-sided printing/double-sided printing, the selection of the sheet feeding/discharging location, and print resolution, and render data 106 (see FIG. 2) obtained by resolving a DDI call expressing the page render contents into the respective instructions and parameters, and generates a spool document list 104 (see FIG. 2) by associating the print condition data 105 and the render data 106 for each page.

Figure 2:
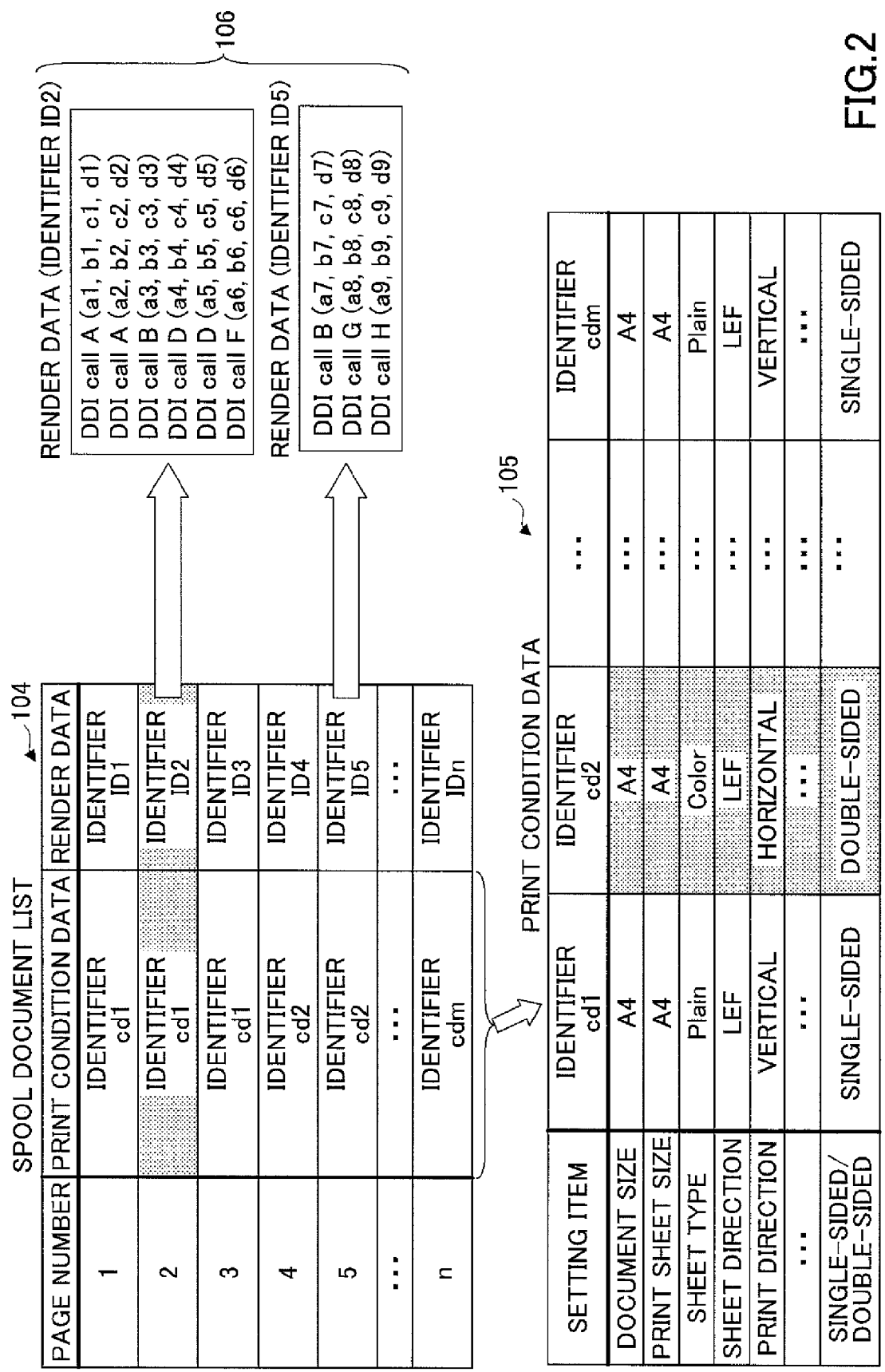
FIG. 2 illustrates examples of a spool document list managed by a spool unit and print condition data and render data referred to with the spool document list.

FIG. 2 illustrates examples of the spool document list 104 managed by the spool unit 133, and the print condition data 105 and the render data 106 referred to with the spool document list 104.

In the spool document list 104, the print condition data 105 and the render data 106 are associated to each other by identifiers, in the order of page numbers (1, 2, . . . , n) of the document data 101.

The print condition data 105 is for managing, with identifiers (cd1, cd2, . . . , cdm), the print conditions 102 specified by the print condition setting unit 131, and an assembly of print conditions for each page such as the sheet size specified by the application software 11.

The render data 106 is for managing, with identifiers (ID1, ID2, . . . , IDn), the DDI calls of characters, figures, and images rendered on the respective pages of the document data 101, by assemblies in which the instructions and parameters are respectively recorded.

Referring back to FIG. 1, the print pattern management unit 135 of the printer driver 13 manages standard print conditions 107 (see FIG. 3), standard render data 108 (see FIG. 4), and a print pattern list 109 (see FIG. 5).

FIG. 3 illustrates an example of the standard print conditions 107 managed by the print pattern management unit 135.

The standard print conditions 107 include setting items of print conditions that can be specified by the print condition setting unit 131 and the document data 101. The standard print conditions 107 are classified by different values of the setting items, and assemblies of the setting items and the values are managed by identifiers (cpA, cpB, . . . , cpZ).

The standard print conditions 107 are referred to by identifiers in the print pattern list 109, and are used for determining which standard print condition 107 matches the print conditions specified in each page of the document data 101.

When determining the matching condition, the setting items of the standard print conditions 107 having a value indicating "comply with document setting" are excluded from the items used for determining which standard print condition 107 matches the print conditions specified in each page of the document data 101. Only the setting items having a value that does not indicate "comply with document setting" are used for determining the matching condition.

As to the standard print conditions 107, by operating the operation input device 14 via the screen displayed on the display device 15 by the screen display unit 132, it is possible to change the values of the setting items, and add/delete assemblies of setting items.

In the standard print conditions 107, it is possible to register print conditions used for inserting banner pages, slip sheets, and separation sheets, and replacing a particular sheet with another sheet that has already been printed.

FIG. 4 illustrates an example of the standard render data 108 managed by the print pattern management unit 135.

The standard render data 108 is an assembly in which instructions and parameters of DDI calls, including characters, figures, and images rendered mainly by document data that is standardized such as forms, are recorded. The standard render data 108 is managed by identifiers (IPA, IPB. . . . , IPZ).

The render data and the identifiers of the document data 101 handled by the application software 11 are registered by operating the operation input device 14 via a screen displayed on the display device 15 by the screen display unit 132. For example, a form A may be registered as IPA, a form B may be registered as IPB, a form C may be registered as IPC, and a blank page and render data for sheet replacement may be registered as IPO.

Furthermore, in the standard render data 108, the combinations of identifiers and render data may be deleted by operating the operation input device 14 via a screen displayed on the display device 15 by the screen display unit 132.

The standard render data 108 is referred to from the print pattern list 109 by an identifier, and is used for determining which standard render data 108 matches the render contents of each page in the document data 101.

In the standard render data 108, it is possible to register standard render data used when inserting banner pages, slip sheets, and separation sheets, and replacing a particular sheet with another sheet that has already been printed.

FIG. 5 illustrates an example of the print pattern list 109 managed by the print pattern management unit 135.

The print pattern list 109 includes standard patterns 110 and print application patterns 111, in which identifiers of the standard print conditions 107 and the standard render data 108 are combined. The print pattern list 109 is for managing combination information of print conditions and render data among the pages.

The standard patterns 110 may describe combinations of print conditions and render data of the pages, by plural combinations of arbitrary standard print conditions 107 and arbitrary standard render data 108.

In business operations for printing a large amount of forms with a high-end printer, the formats of the forms are determined in advance, and various formats of forms are prepared in accordance with the printing purpose. Therefore, combinations of standard render data expressing the respective render contents of characters, figures, and images for each form may be saved as the standard patterns 110.

For example, the standard pattern 110 "cpA*(IPA+IPB+IPB+IPD)" of "ID=P2" means render data including continuous standard render data as IPA, IPB, IPB, IPD, for a page having a standard print condition of cpA, i.e., a sheet size "A4".

For example, the standard pattern 110 "cpO*(IPA+IPB) before cpO*(IPC+IPD)" of "ID=P4" means that the standard print conditions are render data including continuous standard render data IPA, IPB according to document settings, and the standard print conditions are render data including continuous standard render data IPC, IPD according to document settings, and that the combination of the continuous render data IPA, IPB comes before the continuous render data IPC, IPD.

Similar to the standard patterns 110, the print application patterns 111 may describe combinations of print conditions and render data of the pages to be printed, by plural combinations of arbitrary standard print conditions 107 and arbitrary standard render data 108.

According to the characteristics of a high volume form printing operation of generating form data (print job) by combining forms, the user himself can define an object print pattern as the print application pattern 111, from combination patterns of plural types of forms.

The description contents of the standard patterns 110 and the print application patterns 111 may be added, deleted, and updated, by operating the operation input device 14 via a screen displayed on the display device 15 by the screen display unit 132.

The render data comparison unit 134 described below determines which page range in the spool document list 104 recording the print condition data 105 and the render data 106 saved in the spool unit 133 matches which standard pattern 110 in the print pattern list 109 managed by the print pattern management unit 135.

When the render data comparison unit 134 detects a matching standard pattern 110, the page range corresponding to the spool document list 104 is replaced by the combination of the standard print conditions 107 and the standard render data 108 described in the print application pattern 111 corresponding to the standard pattern 110.

In FIG. 5, for example, when the standard pattern 110 "cpA*(IPA+IPB+IPB+IPD)" of "ID=P2" is the standard pattern 110 detected by the render data comparison unit 134, the print application pattern 111 "cpA*(IPA+IPB+IPO+IPB+IPD)" of "ID=P2" is referred to, and between the IPB of the second page and the IPB of the third page among render data including four continuous pages, a blank page IPO is inserted by a standard print condition cpA, i.e., a sheet size A4.

When the standard pattern 110 "cpO*(IPA+IPO+IPB+IPC)" of "ID=P3" is the standard pattern 110 detected by the render data comparison unit 134, the print application pattern 111 "cpO*(IPA+IPR+IPB+IPC)" of "ID=P3" is referred to, and among render data including four continuous pages, a blank page IPO of the second page is replaced with standard render data IPR, by a standard print condition cpO, i.e., directly using the print condition of the second page of the document data.

When the standard pattern 110 "cpB*(IPA+IPB+IPC)" of "ID=P5" is the standard pattern 110 detected by the render data comparison unit 134, the print application pattern 111 "cpB*(IPA+IPB)" of "ID=P5" is referred to, and among render data including three continuous pages, the render data IPC of the third page is not printed.

The render data comparison unit 134 makes a comparison to determine whether any of the standard patterns 110 in the print pattern list 109 managed by the print pattern management unit 135 matches the spool document list 104, the print condition data 105, and the render data 106 saved in the spool unit 133. When a matching standard pattern 110 is detected, the render data comparison unit 134 refers to the print application pattern 111 corresponding to the detected standard pattern 110, and generates a spool print list 116 (see FIG. 8).

FIG. 6 illustrates a process of comparing the print condition data 105 of the spool document list 104 with the standard print conditions 107 performed by the render data comparison unit 134.

The render data comparison unit 134 determines whether the identifiers (cd1, cd2, cdm) of the print condition data 105 in the spool document list 104 match the values of the setting items of the reference destination data of the identifiers, by each of the identifiers (cpA, cpB, . . . , cpZ) of the standard print conditions 107.

When all setting items match, the similarity is 100%. When the value of the standard print condition 107 indicates "comply with document setting", it is determined that the values of the print condition data 105 and the standard print conditions 107 match.

FIG. 7 illustrates an example of a process of comparing the render data 106 of the spool document list 104 with the standard render data 108, performed by the render data comparison unit 134.

The render data comparison unit 134 determines the extent to which the identifiers (ID1, ID2, . . . , IDn) of the render data 106 of the spool document list 104 match the instructions and parameters of DDI calls of reference destination data of the identifiers (IPA, IPB, . . . , IPO, . . . ) of the standard render data 108.

The similarity is expressed according to the extent to which the DDI instructions and parameters of the standard render data 108 match the DDI instructions and parameters of the render data 106 that is compared.

For example, when the DDI instructions of the standard render data 108 "IPA" are used for all the render data 106 and the respective parameter values of the DDI instructions match within a allowable range, even if DDI instructions and parameter values not included in the standard render data 108 "IPA" are used in the render data 106, it can be determined that the similarity is 100%.

All of the render data 106 and the standard render data 108 are compared, and the standard render data 108 having a similarity that is greater than or equal to a certain standard and having the highest similarity by each page is listed.

Figure 8:
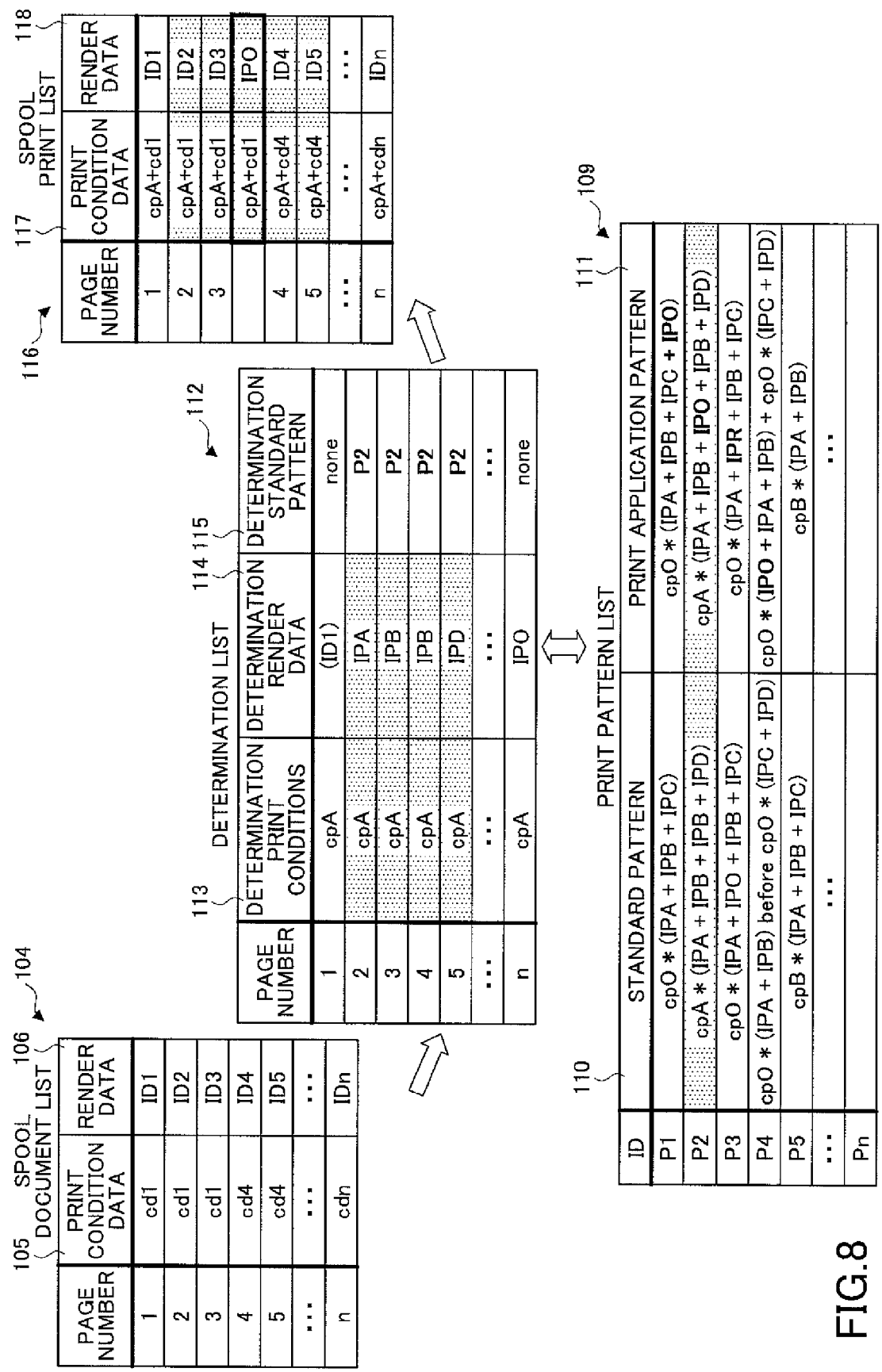
FIG. 8 illustrates a process performed by a render data comparison unit for generating a spool print list from a spool document list by referring to a print pattern list, based on a determination list including the results of comparing print condition data with standard print conditions and the results of comparing render data and standard render data.

FIG. 8 illustrates a process performed by the render data comparison unit 134, for generating the spool print list 116 from the spool document list 104 by referring to the print pattern list 109, based on a determination list 112 including the results of the process of comparing the print condition data 105 with the standard print conditions 107 and the results of the process of comparing the render data 106 and the standard render data 108.

In FIG. 8, based on the results of the process of comparing the print condition data 105 with the standard print conditions 107 indicated in FIG. 6, the identifiers of the standard print conditions 107 that best match the respective items of the print condition data 105 in the spool document list 104 are written into determination print conditions 113 of the determination list 112 by each page number.

In FIG. 8, based on results of the process of comparing the render data 106 and the standard render data 108 indicated in FIG. 7, the identifiers of the standard render data 108 that best match the respective items of the render data 106 in the spool document list 104 are written into determination render data 114 of the determination list 112 by each page number.

When the combination of the determination print conditions 113 and the determination render data 114 for a certain page in the determination list 112 is determined, the render data comparison unit 134 refers to the print pattern list 109 and determines whether there is a matching standard pattern 110 in consideration of the order of the pages.

The initial value of each page for a determination standard pattern 115 in the determination list 112 is "none", and when a page matching the standard pattern 110 in the print pattern list 109 is detected, the identifier of the print pattern list 109 is written into the page corresponding to the determination standard pattern 115.

For example, as to the second to fifth pages, the determination print condition 113 is "cpA", and the determination render data 114 is continuous data of "IPA", "IPB", "IPB", and "IPD", and therefore, the identifier P2 of the print pattern list 109 is applicable. Accordingly, the determination standard pattern 115 of the page numbers "2" through "5" is "P2".

Furthermore, when the determination standard pattern 115 of the determination list 112 is written in, the print data generating unit 136 described below writes print condition data 117 and render data 118 in the spool print list 116.

In the print condition data 117, the identifiers of the determination print conditions 113 corresponding to the respective page numbers are written in. When a value of the setting items indicating "comply with document setting" is included in the determination print conditions 113, the identifier of the print condition data 105 of the corresponding page number in the spool document list 104 is also written in.

In the render data 118, the identifiers of the render data 106 corresponding to the respective page numbers are written.

Furthermore, when inserting a page of "IPO" between pages as in the case of the print application pattern 111 "P2", the corresponding print condition data 117 and the render data 118 are added to the spool print list 116.

The print data generating unit 136 generates the print data 103 that can be processed by the printer 2, by referring to the spool print list 116 generated in collaboration with the render data comparison unit 134, and the print condition data 105 and the render data 106 saved by the spool unit 133.

When an identifier is written in the print condition data 117 of the spool print list 116, the print data generating unit 136 refers to values of the setting items of the corresponding standard print conditions 107 or print condition data 105, and coverts the data into a ticket or a printer control command in JDF (Job Definition Format) that can be processed by the printer 2.

Furthermore, when an identifier is written in the render data 118 of the spool print list 116, the print data generating unit 136 refers to the corresponding render data 106 or standard render data 108, and converts the data into PDL that can be processed by the printer, according to the instructions and parameters of the DDI call.

The print data 103 generated as described above is printed by the printer 2 via the graphic sub system 121.

When all processes of converting the data into the print data 103 are completed, the print data generating unit 136 reports to the spool unit 133 that the conversion process has ended, and deletes the spool document list 104, the print condition data 105, the render data 106, the determination list 112, and the spool print list 116 from the storage device 16 of the computer 1.

At this time, the spooled print condition data 105 and render data 106 may be saved in the storage device 16 of the computer 1 without being deleted.

In the above-described operations, the spool print list 116 is automatically generated from the determination list 112, and the print data 103 is generated based on the spool print list 116. However, at the stage where the determination standard pattern 115 of the determination list 112 is determined (including cases where the determination list 112 is not determined), the determination standard patterns 115 determined for each page may be displayed on the screen of the display device 15 by the screen display unit 132 to receive a selection from the user. For example, while the determination standard patterns 115 determined for each page may be displayed on the screen, the user may select any one of the operations of "continue print process", "cancel print process", and "change applied page range and print application pattern". In this case, when "continue print process" is selected, the above operation is continued. When "cancel print process" is selected, the print process is canceled. When "change applied page range and print application pattern" is selected, the user is prompted to select the print application pattern to be applied with the operation input device 14. Then, the determination standard pattern 115 of the determination list 112 is replaced, and the above process is continued based on the replaced determination standard pattern 115.

Furthermore, the application frequency of the standard pattern 110 and the print application pattern 111 in the print pattern list 109 is recorded, and when plural standard patterns that are most similar are detected by the process of the render data comparison unit 134, a list including combinations of standard patterns and print application patterns according to the application frequency is displayed on the screen (for example, the patterns are listed in descending order of application frequency). Then, the user may be prompted to select a print application pattern from the list.

Overview

As described above, according to the present embodiment, the following advantages are attained.

(1) The present embodiment is different from the conventional technology in that combinations of standard print conditions such as the sheet size, single-sided/double-sided printing, the selection of the sheet feeding/discharging location, and print resolution, and standard render data expressing render contents of characters, figures, and images of document data, are saved as "standard patterns". Furthermore, combinations of standard print conditions and standard render data used when inserting banner pages, slip sheets, and separation sheets, replacing a particular sheet with another sheet that has already been printed, and not printing a particular sheet, are saved as "print application patterns". The "print application patterns" and the "standard patterns" may be arbitrarily associated with each other. When printing the document data, the print condition data and the render data are spooled by each page, the standard print conditions and the standard render data are respectively compared, and a "standard pattern" that is most similar is detected for each page range. The "print application pattern" corresponding to the detected standard pattern is referred to, and print conditions are generated for a particular page range by combining standard print conditions and print conditions of the document data for each page. From the render data of the document data or from the standard render data, print data such as PDL that can be processed by the printer is generated. Accordingly, by using a printer driver that can perform printing by combining exceptional settings that are different from the print settings of the entire document, exceptional settings such as inserting banner pages, slip sheets, and separation sheets, or replacing a particular sheet with another sheet that has already been printed, or not printing a particular page, can be specified in detail for each page, and the page range to which the exceptional settings are to be applied can be easily specified.

(2) By providing a unit for adding, deleting and updating the standard patterns and print application patterns, it is possible to easily register new forms as the standard render data, and make detailed adjustments to the exceptional settings by changing printing operations.

(3) By referring to the print application pattern corresponding to the detected standard pattern, and generating print conditions by standard print conditions and print conditions of the document data for each page, detailed print settings can be made for each page by combining the print setting set in the document data and print conditions associated with the print application pattern, without overwriting the print settings set in the document data with the print conditions associated with the print application pattern.

(4) The page range to which the combination of the standard pattern and the print application pattern is to be applied is recorded and displayed on a screen, and the user is prompted to select a subsequent process. Accordingly, it is possible to make prior confirmation of the application status of the exceptional settings, before printing the document. Furthermore, it is possible to arbitrarily change the print application pattern during printing.

(5) When the application frequencies of combinations of standard patterns and print application patterns are recorded and plural standard patterns that are most similar are detected, combinations of standard patterns and print application patterns listed according to the application frequency are displayed on a screen, and the user is prompted to make a selection from the list. Accordingly, when a certain page of the document data matches plural standard patterns that are registered, it is possible to recommend which print application pattern is to be applied for printing the page, based on past print records.

According to an embodiment of the present invention, by using a printer driver, which can perform printing by combining exceptional settings that are different from the print settings of the entire document, exceptional settings such as inserting banner pages, slip sheets, and separation sheets, or replacing a particular sheet with another sheet that has already been printed, or not printing a particular page, can be specified in detail for each page, and the page range to which the exceptional settings are to be applied can be easily specified.

The present invention is not limited to the specific embodiments described herein, and variations and modifications may be made without departing from the scope of the present invention.

The present application is based on Japanese Priority Patent Application No. 2011-144230, filed on Jun. 29, 2011, the entire contents of which are hereby incorporated herein by reference.

What is claimed is:

1. A computer, comprising:
a memory configured to store one of a plurality of programs; and
a processor configured to execute the one of the plurality of programs,
wherein the one of the plurality of programs is a printer driver that operates on basic software when printing with a printer from application software of the computer, and
wherein the printer driver which, when executed by the processor functions as:
a first unit configured to specify a print condition;
a second unit configured to hold, as a standard pattern, a combination of a standard print condition and standard render data expressing render contents of document data;
a third unit configured to hold, as a print application pattern, a combination of a standard print condition and standard render data used when inserting a banner page, a slip sheet, and a separation sheet, or replacing a particular sheet with another sheet that has already been printed, or not printing a particular page;
a fourth unit configured to arbitrarily associate the print application pattern with the standard pattern;
a fifth unit configured to spool a document print condition and document render data included in the document data for each page when printing the document data;
a sixth unit configured to compare the document print condition and the document render data with the standard print condition and the standard render data, and detect a most similar standard pattern for each particular page range;
a seventh unit configured to refer to the print application pattern corresponding to the detected standard pattern, and generate a print condition for each page of the particular page range; and
an eighth unit configured to generate print data that can be processed by the printer, based on the document render data or the standard render data.

2. The printer driver according to claim 1, wherein the printer driver further functions as
a ninth unit configured to add, delete, and update the standard pattern and the print application pattern.

3. The printer driver according to claim 1, wherein
the seventh unit refers to the print application pattern corresponding to the detected standard pattern, and generates the print condition by combining the standard print condition and the document print condition for each page.

4. The printer driver according to claim 1, wherein the printer driver further functions as
a tenth unit configured to record a page range for applying a combination of the standard pattern and the print application pattern;
an eleventh unit configured to display, on a screen, the page range for applying the combination of the standard pattern and the print application pattern;
a twelfth unit configured to prompt a selection from among operations of "continue print process", "cancel print process", and "change applied page range and print application pattern" with the use of the eleventh unit; and
a thirteenth unit configured to select a page of the document data and the print application pattern to be applied to each page, when "change applied page range and print application pattern" is selected by the twelfth unit, wherein
the seventh unit refers to the print application pattern selected by the thirteenth unit, and generates the print condition for each page of the particular page range, and
the eighth unit refers to the print application pattern selected by the thirteenth unit, and generates the print data that can be processed by the printer, based on the document render data or the standard render data.

5. The printer driver according to claim 4, wherein the printer driver further functions as
a fourteenth unit configured to record an application frequency of the combination of the standard pattern and the print application pattern;
a fifteenth unit configured to display, on a screen, a list of combinations of the standard pattern and the print application pattern according to the application frequency, when a plurality of the most similar standard patterns are detected; and
a sixteenth unit configured to prompt a selection of a page of the document data and the print application pattern to be applied to each page, from the list of combinations displayed by the fifteenth unit.

* * * * *